United States Patent [19]

Liebisch

[11] 4,238,435

[45] Dec. 9, 1980

[54] PLASTIC EXTRUSION

[75] Inventor: Wolfgang F. Liebisch, Reading, England

[73] Assignee: Victroplas Limited, Solihull, England

[21] Appl. No.: 929,906

[22] Filed: Aug. 1, 1978

[30] Foreign Application Priority Data

Aug. 9, 1977 [GB] United Kingdom ............... 33310/77

[51] Int. Cl.³ .............................................. B29F 3/00
[52] U.S. Cl. ..................................... 264/75; 264/167;
264/178 R; 264/209; 264/557; 264/560;
264/562
[58] Field of Search .................... 264/209, 167, 178 R,
264/557, 560, 562, 75

[56] References Cited

U.S. PATENT DOCUMENTS

| 3,399,262 | 8/1968 | Quackenbush et al. | 264/209 |
| 3,812,230 | 5/1974 | Takahashi | 264/209 |
| 4,110,062 | 8/1978 | Summers | 264/178 R |

Primary Examiner—James H. Derrington
Attorney, Agent, or Firm—Berman, Aisenberg & Platt

[57] ABSTRACT

A method of making elongated members of thermoplastic material which simulate natural bamboo by continuously extruding the material through a die, cooling the extruded material downstream of the die, gripping the cool material and transporting the material away from the die and slowing the speed of transport relative to the speed of extrusion at predetermined lengths of extrusion to produce regions of greater external cross-sectional dimensions to provide axially spaced nodes similar to those of bamboo.

7 Claims, 7 Drawing Figures

PLASTIC EXTRUSION

BACKGROUND OF THE INVENTION

1. Field of the Invention

This invention relates to the manufacture of elongated members of thermoplastic material.

2. Summary of the Invention

An object of the invention is to produce such elongated members which simulate natural bamboo in appearance and thus have axially-spaced node-like projections of irregular shape on a stem.

According to one aspect of the invention we provide a method of producing an elongated member of thermoplastic material simulating a length of natural bamboo and comprising continuously extruding said material through a die while in a hot and fluent state into a region which permits increase in external transverse dimension of the extrudate, cooling the material downstream of the die, transporting the material away from the die and intermittently slowing the speed of transport relative to the speed of extrusion at predetermined lengths of extrusion thus to produce regions of greater external cross sectional dimensions of the extruded member to provide axially spaced node-like projections of irregular shape on the member.

An important feature of our invention is that each node produced by the method described above is slightly different to other nodes so that a length of the extrudate has nodes which are different to each other as is the case with natural bamboo so that the member simulates well the appearance of natural bamboo.

Another important feature of our invention is that we can produce both axial and circumferential irregularities in the surface of the nodes as a result of rapid cooling the surface of the extrudate a short distance downstream of the die exit by means of a water jet directed on to the surface of extrudate a short distance downstream of the die exit followed by a further rapid cooling of the extrudate for example in a water bath downstream of the jet.

It is thought that the rapid chilling action of the water jet together with the unstable wave front of the water set up on the extrudate leads to said irregulatities in the surface. We have found that the positioning of the water jet and the rate of flow are critical and the best position and flow rate must be found by trial and error with the particular material being extruded and the rate and other parameters of extrusion concerned to give the best simulation of natural bamboo.

Since the extrudate must enter the water bath through a flexible sealing member contact between the member and the extrudate can contribute to the formation of irregularities in the surface of the nodes.

If desired, instead of a water bath a plurality of water jets may be provided.

The member is preferably tubular in which case the projections are accompanied by an increase in the cross-sectional bore of the tubular member.

The thermoplastic material may be a rigid thermoplastic material such as polyvinyl chloride.

If desired the extrudate may be reinforced by a tube of metal or other relatively rigid material in which case less rigid thermoplastic material, such as polythene, may be used.

If there is no variation in the relative speed of extrusion and transport between said predetermined lengths we can obtain a member of generally constant cross-section between the projections thus simulating the appearance of natural bamboo where the anti-node portions are generally of constant cross section. Preferably, the extrusion is maintained at a substantially constant speed and the transport is intermittently stopped to produce the node like projections. The thermoplastic material continues to flow out of the die while the transport is stopped thus producing the hereinbefore described projections which simulate the nodes of natural bamboo. Normally the speed of transport between the stops is such as to give a generally constant cross section to the part of the member which simulates the anti-nodes of natural bamboo.

An apparatus for producing an elongated member of thermoplastic material simulating a length of natural bamboo may comprise means for continuously extruding said material through a die while in a hot and fluent state into a region which permits increase in external transverse dimension of the extrudate, means for cooling the extruded material downstream of the die, means downstream of the cooling means for gripping the cool material and means for driving the gripping means to transport the material away from the die at a cyclically variable speed.

Preferably, the gripping means comprises a pair of caterpillar devices and these are driven intermittently through a one-way clutch; the one-way clutch may be driven by a fluid cylinder and the stoke of the cylinder may be varied to vary the length of the member between adjacent projections. Alternatively the caterpillar devices may be driven from a continuously running motor by way of a clutch which may be controlled by a fluid cylinder.

The cooling means may comprise a water jet immediately downstream of the die followed by a further cooling means.

The further cooling means may comprise a water bath.

The extrudate may enter the water bath through a sealing member which contacts the surface of the extrudate and contributes to the formation of irregularities in the surface of projections formed on the extruded material as a result of slowing of the speed of transport relative to the speed of extrusion by said means for driving the gripping means at a cyclically variable speed.

BRIEF DESCRIPTION OF THE DRAWINGS

The invention will now be described in detail by way of example with reference to the accompanying drawings in which.

DESCRIPTION OF THE PREFERRED EMBODIMENTS

Figure 3:
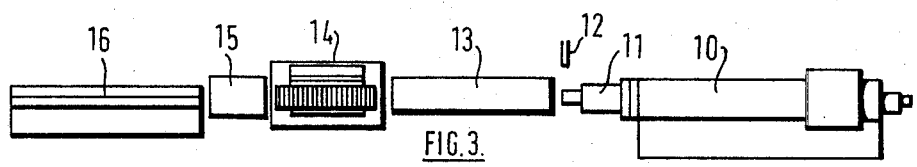
FIG. 3 is a diagrammatic view of the apparatus for producing the material of FIG. 1.
Figure 4:
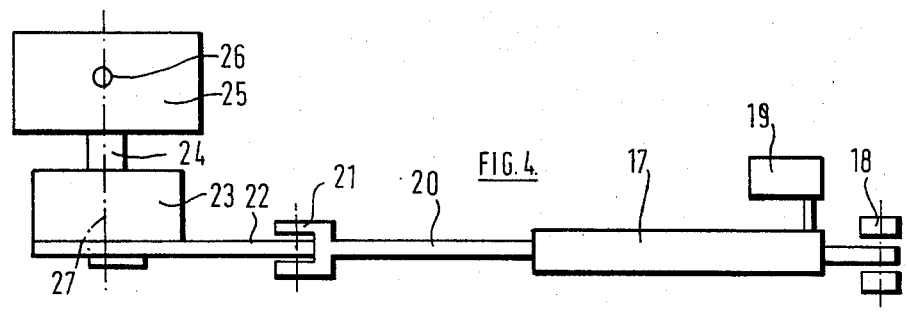
FIG. 4 is a diagram illustrating one means for driving the gripping means.

Referring first to FIGS. 3 and 4, a conventional plastics material extruder 10 plasticises rigid polyvinylchloride and extrudes it through a die 11 containing a central pin to produce a tubular extrudate. The extrudate will normally be cylindrical but other cross-sectional shapes may be used. The extrudate then passes a water jet 12 and through a water bath 13 which cools it sufficiently to enable it to be gripped. The material when issuing from the die 11 is in a hot and fluent state.

The cooled material then passes through a gripper device 14 which comprises a pair of caterpillar devices between which the material is gripped. The take-off or gripper device 14 pulls the material away from the die and prevents any build-up in front of the die. If the speed of the take-off device 14 is the same as the speed of the extrusion the material is of constant cross sectional area. The material then passes to a saw 15 in which it is sawn to required lengths and then passes to a table 16 which which is inclined transverseley to the direction of movement of the material and accumulates the material at its lower edge.

The take-off device 14 is driven intermittently through the arrangement shown in FIG. 4. There is a pneumatic cyclinder 17 which at one end is pivoted at 18. The operation of the cylinder is controlled through a valve 19. A piston 20 of the pneumatic cylinder is provided at its end with a clevis 21 in which is pivoted an arm 22. The arm is connected to the input of a one-way clutch 23, the output 24 of which is connected to a worm-drive 25. The output of the worm-drive 25 is indicated at 26 and drives the caterpillar divices 4. When the piston rod 20 moves from its retracted position to its extended position it rocks the arm 22 about a pivot axis 27 thus driving the output 24 through the clutch 23 and thus driving the take-off device 14 through the worm-gear 25. When the piston rod 20 retracts, the one-way clutch is inoperative and the take-off device is stationary during retraction of the piston rod 20. It will be seen, therefore, that the take-off device 14 is driven intermittently every time the air cylinder 17 is operated to extend the piston rod 20 and is stationary during retraction of the piston rod 20. The operation of the air cylinder is controlled by the air valve 19 and means, not shown, may be provided for causing the piston rod 20 to retract after it has extended by a desired distance.

Figure 5:
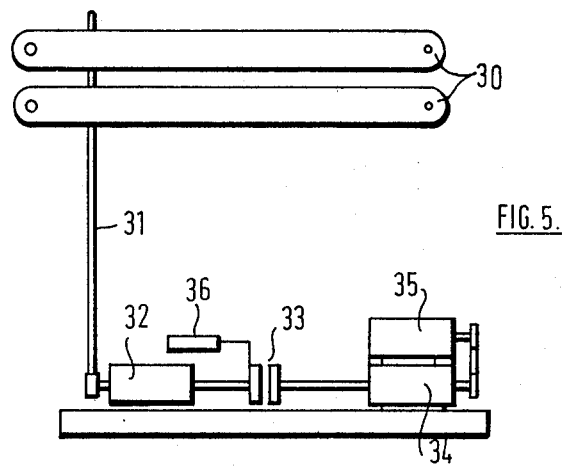
FIG. 5 is a diagram illutrating another means for driving the gripping means.

In FIG. 5 there is shown diagrammatically an alternative form of take-off device. This comprises a pair of caterpillar devices 30 between which the extrudate is gripped, the caterpillar devices being driven by way of a shaft 31, reduction gear 32, clutch 33, and variable speed gear 34, from a motor 35. The clutch is engaged or disengaged by an air cylinder 36. Operation of the air cylinder is controlled by a timing device, adjustable to vary the respective times for which the clutch is engaged and disengaged.

Figure 1:
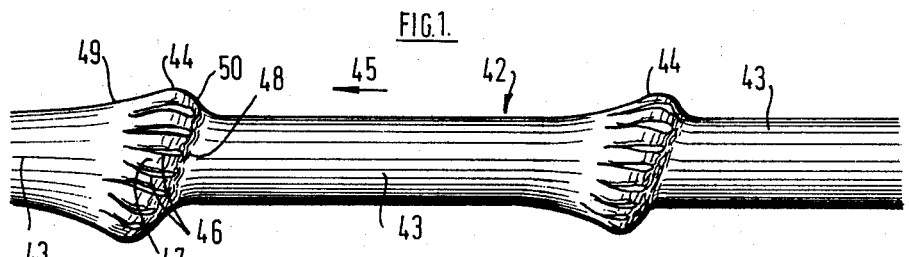
FIG. 1 is a side elevation of a length of material simulating natural bamboo made by a method embodying the invention.
Figure 2:
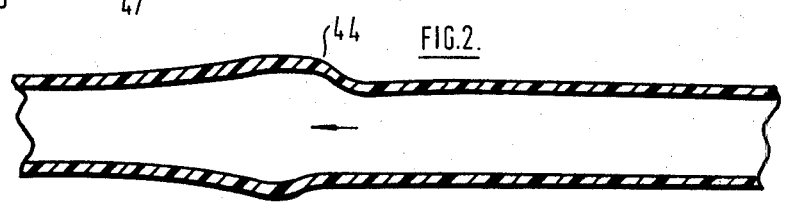
FIG. 2 is a section through one of the nodes of the material of FIG. 1.

Referring now to FIGS. 1 and 2, the extruded material is indicated at 42 and comprises a series of axially spaced portions 43 of substantially constant tubular cross section which simulate the anti-nodes of natural bamboo and between adjacent portions 43 are projections 44 which simulate the nodes of natural bamboo.

The direction of extrusion is indicated by the arrow 45. It will be seen that the projections 44 have axial ribs 47 separated by axial recesses 46 and circumferential irregularities 48 which simulate natural bamboo. It will also be noted that the slope of each projection is less steep on the leading side 49 thereon than on the trailin side 50 and that a section taken through the maximum cross section of the node is inclined at less than 90° to the longitudinal axis of the extrudate.

What happens is that when the take-off means 14 is stationary, material which continues to come out of the extruder forms a distension in the tube as indicated in FIG. 2 thus producing the projection and increasing the bore of the tube. When the transport device again starts to move, the material is extruded as a substantially constant cross-sectional area tube until the transport device again stops.

Figure 6:
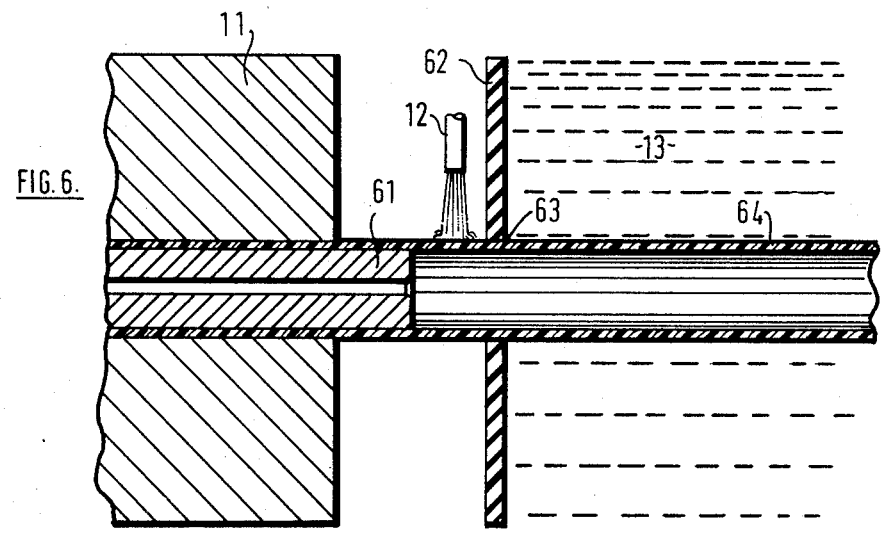
FIG. 6 is a section depicting one stage of extrusion of material showing the formation of a part simultating an anti-node of natural bamboo.
Figure 7:
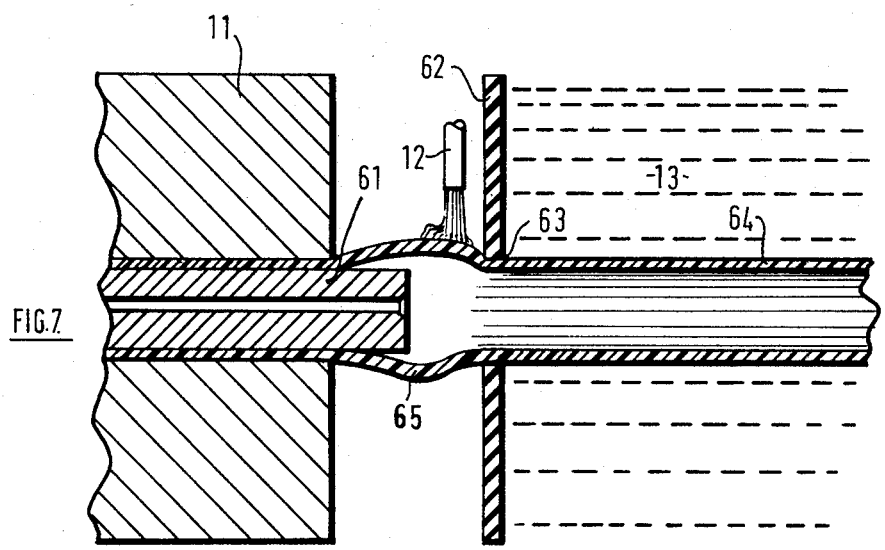
FIG. 7 is a section depicting another stage of extrusion of material showing the formation of a part simulating a node of natural bamboo.

This process is shown in FIGS. 6 and 7. In these figures the die is indicated at 11, and the central pin at 61. Adjacent the die is a seating member 62 of rubber or other flexible material provided with an aperture 62 through which material extruded from the die passes and which sealing engages the surface of the extrudate and prevents exit of water from the water bath 13.

FIG. 6 shows the situation when the take-off device 14 is operating to remove extruded material from the die at a constant speed. Material extrudes as a tubular member 64 of constant cross section. When the take-off means ceases to remove material from the die, the material which continues to extrude from the die forms a projection 65 in the tube wall, as it is permitted to extend into a free space downstream of the die exit and hence the projections 65 are formed without any mechanical constraint being applied to the surface of the extrudate.

Water from the jet 12 playing on the surface of the tube as it emerges from the die 11 chills on the surface of the extrudate and forms a semi-solid skin whilst the remainder of the tube remains fluent and thus the skin is susceptible to take up the shape of ripples formed in the wave front of the water as the tube advances after an arrest. Also, the rapid cooling causes longitudinal contraction wrinkles to be formed in the surface of the nodes as further material beneath the surface skin cools which, as the tube enters the water bath 13, are consolidated into the recesses 46 and 47.

The projections 65 contact the boundary of the aperture 63 in member 62 when the take-off device 14 resumes operation. As the extruded material is still fluent at this stage, the contact of the outer surface of projection 41 with the gate can contribute to the forming of ribs 46 and recesses 47 to simulate the nodes of bamboo. If desired the aperture in the member 62 may have a serrated or other appropriate profile to assist the formation of the ribs and recesses in the projection. Because the gate is of flexible material, however, it does not act to reduce the size of the projections.

As mentioned above, the member is preferably made from a rigid polyvinylchloride. If desired, the tubular member could be reinforced by an internal tube in which case the thermoplastic coating will be put on via a cross head. In this case, also it will be possible to use less rigid plastics than rigid PVC.

It is envisaged that normally the material will be tubular because of expense. However it is within the scope of the invention to provide solid material and also to provide tubular material which is other than of generally cylindrical cross-section.

The surface of natural bamboo has a longitudinally extending pattern or grain. This may be simulated by incomplete mixing of colouring matter with the plastics material prior to extrusion thereof. For example, an appropriate colouring matter may be added to the extruded material at spaced time intervals.

The saw 15 may be set to saw the extruded material at an angle to provide a point on each cut length of material to assist its being inserted into the ground, as bamboo for horticultural purposes may be required to be used. If desired the anti-nodes may be of other than constant cross-section by appropriate variation in the relative speed of extrusion and transport.

I claim:

1. A method of producing an elongated member of thermoplastic material simulating over at least part of its periphery a length of natural bamboo having a plurality of anti-node portions of substantially constant cross-section throughout their length and a plurality of axially spaced node portions intermediate said anti-node portions, the node portions being projections having at least one cross-sectional dimension which is greater than the corresponding cross-sectional dimension of the anti-node portions and having a plurality of irregularities in the surface thereof, said method comprising continuously extruding said material through a die while in a hot and fluid state into a region which permits increase in external transverse dimension of the extrudate, cooling the material downstream of the die by means of a water jet directed onto the surface of the extrudate a short distance downstream of the die exit to establish an unstable wave front on the extrudate to cause irregularities to form on the node portions, followed by further rapid cooling of the extrudate, transporting the material away from the die and intermittently slowing the speed of transport relative to the speed of extrusion at predetermined lengths of extrusion thus to produce regions of greater external cross-section dimension than the corresponding cross-sectional dimension of the extrudate in regions not produced by slowing said speed of extrusion thereby providing said axially spaced node portions of irregular shape on the member.

2. A method according to claim 1 wherein said further rapid cooling is achieved by means of a water bath downstream of the water jet.

3. A method according to claim 2 wherein the extrudate enters a waterbath through a flexible sealing member.

4. A method according to claim 3 wherein the flexible sealing member is of a configuration such as to contribute to the formation of irregularities in the surface of the nodes.

5. A method according to claim 1 wherein the member is tubular and the node-like projections are accompanied by an increase in the cross-sectional bore of the tubular member.

6. A method according to claim 1 wherein there is no variation in the relative speed of extrusion and transport between said predetermined lengths so that the member is of generally constant cross-section between the projections which simulate the nodes.

7. A method according to claim 1, or claim 2, or claim 3, or claim 4, or claim 5, or claim 6, wherein the thermoplastic material to be extruded comprises a non-uniform mixture of thermoplastics material and coloring matter whereby the extrudate is provided with longitudinal and circumferential regions of differing color.

* * * * *